(12) United States Patent
Jacquelot

(10) Patent No.: US 10,245,883 B2
(45) Date of Patent: Apr. 2, 2019

(54) FOLDABLE WHEEL

(71) Applicant: BAGOLF Limited, Hong-Kong (CN)

(72) Inventor: Bertrand Jacquelot, Hong-Kong (CN)

(73) Assignee: BAGOLF LIMITED, Hong Kong (CN)

( * ) Notice: Subject to any disclaimer, the term of this patent is extended or adjusted under 35 U.S.C. 154(b) by 116 days.

(21) Appl. No.: 15/422,609

(22) Filed: Feb. 2, 2017

(65) Prior Publication Data

US 2017/0232789 A1  Aug. 17, 2017

(30) Foreign Application Priority Data

Feb. 16, 2016 (FR) .................................... 16 00251

(51) Int. Cl.
*B60B 19/04* (2006.01)
*B60B 25/02* (2006.01)

(52) U.S. Cl.
CPC .............. *B60B 19/04* (2013.01); *B60B 25/02* (2013.01); *B60B 2900/112* (2013.01); *B60B 2900/115* (2013.01); *B60B 2900/351* (2013.01); *B60B 2900/531* (2013.01)

(58) Field of Classification Search
CPC ... B60B 19/04; B60B 25/02; B60B 2900/115; B60B 2900/351; B60B 2900/531; B60B 2900/112
USPC .......... 301/32, 55, 58, 67, 73, 704, 70, 101, 301/95.101, 95.102, 95.103
See application file for complete search history.

(56) References Cited

U.S. PATENT DOCUMENTS

| 3,179,431 | A | * | 4/1965 | Pikl ........................ A61G 5/061 |
| | | | | 152/13 |
| 4,056,285 | A | * | 11/1977 | Wright .................... B60B 25/02 |
| | | | | 301/32 |
| 4,405,321 | A | * | 9/1983 | Budoff ................ A61M 3/0262 |
| | | | | 604/212 |
| 4,465,321 | A | | 8/1984 | Berg |

(Continued)

FOREIGN PATENT DOCUMENTS

| EP | 2 832 560 A1 | 2/2015 |
| GB | 573 956 A | 12/1945 |
| WO | 2014/021480 A1 | 2/2014 |

OTHER PUBLICATIONS

FR Search Report, dated Oct. 5, 2016, from corresponding FR application.

*Primary Examiner* — S. Joseph Morano
*Assistant Examiner* — Jean W Charleston
(74) *Attorney, Agent, or Firm* — Young & Thompson

(57) ABSTRACT

Disclosed is a foldable wheel defined about an axis of rotation of the wheel, which includes a closed loop made up of at least two links and, each link being substantially in the shape of a ring sector of section as defined in a plane perpendicular to the axis of rotation of the wheel that in the shape of a trapezoid including two non-parallel faces and, a major base, and a minor base; a unit for mounting the links and to pivot about a pivot axis, including a bearing having two portions and, respectively a pivot pin and a rotary housing, the pin being pivotally mounted in the pivot housing, the male and female bearing portions and being at two points situated in the proximity of the apex of the V-shape, the V-shape being defined by the shape formed by the two facing non-parallel faces of the two links.

10 Claims, 2 Drawing Sheets

(56) References Cited

U.S. PATENT DOCUMENTS

| | | | | |
|---|---|---|---|---|
| 8,371,659 B2* | 2/2013 | Fitzsimons | ............... | B60B 1/14 |
| | | | | 152/277 |
| 8,678,520 B2* | 3/2014 | Sheu | ....................... | B60B 1/041 |
| | | | | 301/32 |

* cited by examiner

FOLDABLE WHEEL

FIELD OF THE INVENTION

The present invention relates to foldable wheels, which find applications in numerous fields, and particularly but not exclusively as wheels for articles such as baby buggies, shopping carts, or trolleys for transporting golf bags or the like, in order to enable those articles to be stored more easily, e.g. in a car trunk.

PRIOR ART

A foldable wheel is already known. By way of example, such a wheel is described and shown in WO 2014/021480.

The foldable wheel in that document, defined relative to an axis of rotation of the wheel, comprises a closed loop made up of a plurality of links, with at least two consecutive links, each being substantially in the form of a ring sector of section as defined in a plane substantially perpendicular to the axis of rotation of the wheel that presents a shape that can be likened to that of a trapezoid, thus having two non-parallel faces, a major base, and a minor base.

The wheel also has means for mounting two consecutive links pivotally relative to each other about a link pivot axis, the two facing non-parallel sides belonging respectively to the two consecutive links being defined in such a manner that when they are not in contact with each other, they form a V-shape with its apex pointing towards the major bases, the V-shape having an angle at the apex that is of non-zero value, and when they are in contact with each other, they form a V-shape with an angle at the apex of zero value, the link pivot axis being situated substantially at the apex of the V-shape and being parallel to the axis of rotation of the wheel.

By using the means for pivotally mounting consecutive pairs of links, the wheel can take on two configurations, a first configuration in which it is unfolded, i.e. presenting a loop of circular shape that enables the wheel to travel by running on ground like any wheel, and a second configuration in which the loop is flattened, thereby substantially reducing its overall size and making it easier to store.

Nevertheless, in the wheel of that above-referenced document, those means for obtaining the two above-defined configurations are of a structure that is very complex and indeed cumbersome, difficult to use, and that gives rise to a wheel that is expensive, thereby considerably limiting its marketing and limiting it to particular applications.

OBJECT AND SUMMARY OF THE INVENTION

An object of the present invention is thus to provide a foldable wheel that tends to mitigate most of the drawbacks of prior art foldable wheels, in particular such as the wheel described in the above-referenced document.

More precisely, the present invention provides a foldable wheel defined above an axis of rotation of the wheel, the foldable wheel comprising a closed loop having at least two consecutive links, each consecutive link being substantially in the form of a ring sector of section defined in a plane that is substantially perpendicular to said axis of rotation of the wheel that presents substantially the shape of a trapezoid, thus including two non-parallel faces, a major base, and a minor base, means for mounting two consecutive links pivotally relative to each other about a link pivot axis, the two non-parallel faces that face each other belonging respectively to two consecutive links being defined in such a manner that when they are not in contact with each other they form a V-shape of apex directed towards the two major bases, said V-shape having an angle at the apex of value that is not zero, and when they are in contact with each other, they form a V-shape with an angle at the apex of zero value, said link pivot axis being situated substantially at the apex of a said V-shape and being parallel to said axis of rotation of the wheel, wherein the means for pivotally mounting the two said consecutive links relative to each other are constituted by:

- a bearing comprising two portions, respectively a male bearing portion forming a pivot pin on the link pivot axis and a female bearing portion forming a pivot housing, said pivot pin being pivotally mounted in said pivot housing; and
- means for mounting said male and female bearing portions respectively at two points belonging respectively to two consecutive links and situated in the proximity of the apex of said V-shape.

BRIEF DESCRIPTION OF THE DRAWINGS

Other characteristics and advantages of the invention appear form the following description given with reference to the accompanying drawings by way of non-limiting illustration, and in which.

MORE DETAILED DESCRIPTION

It is specified initially that the term "trapezoid" is used in the meaning of the present description to designate a geometrical shape that can be likened to a trapezoid, comprising non-parallel sides, each presenting a face that is plane or that can be likened to a plane face, and having two other sides, i.e. minor and major bases, that are parallel (including the sense of curves remaining at a constant distance apart), and for example possibly having the following shapes: for the major base, plane, but preferably circular or the equivalent of radius Ra; and for the minor base, various shapes not specifically having any particular function, but preferably plane or circular of radius appropriate for the desired embodiment of the wheel once unfolded and folded.

Figure 1:
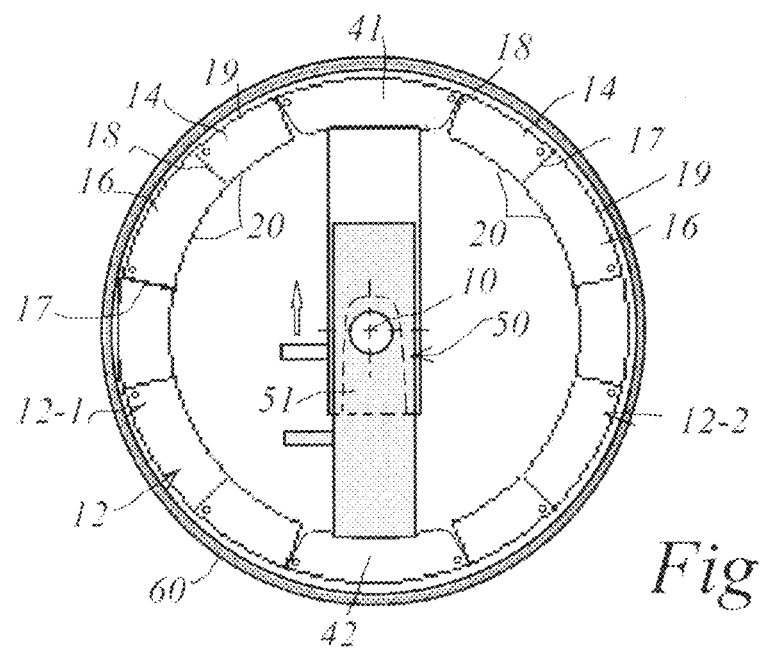
FIG. 1 is a face view of an embodiment of the foldable wheel of the invention in its unfolded configuration.
Figure 2:
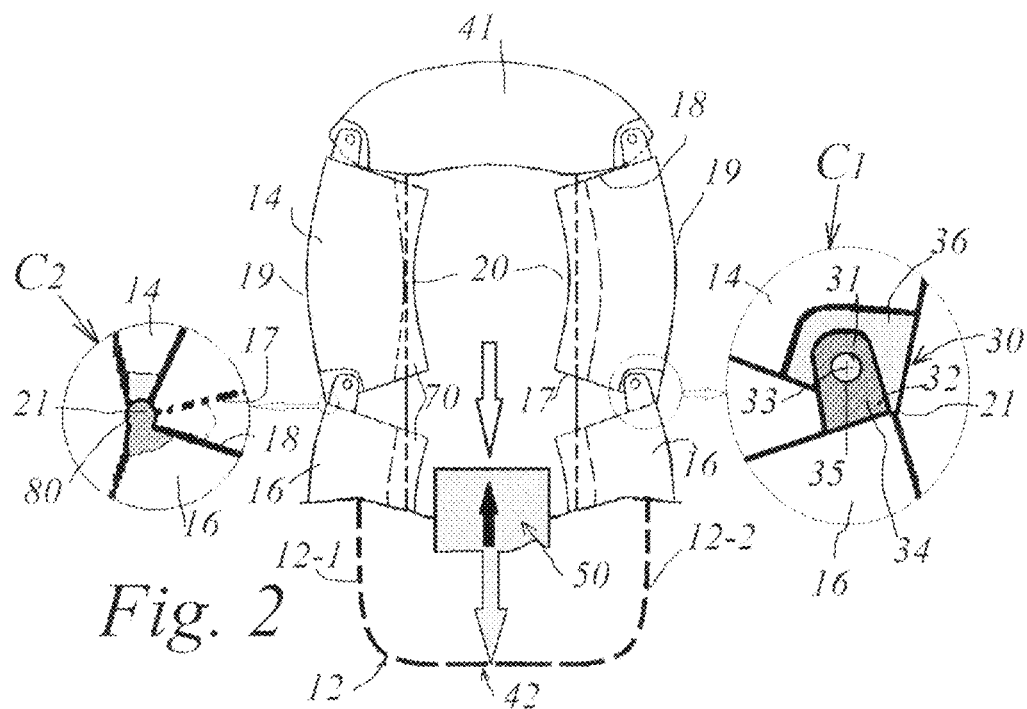
FIG. 2 is a diagrammatic face view of a portion of the FIG. 1 embodiment of a foldable wheel in its folded configuration.
Figure 3:
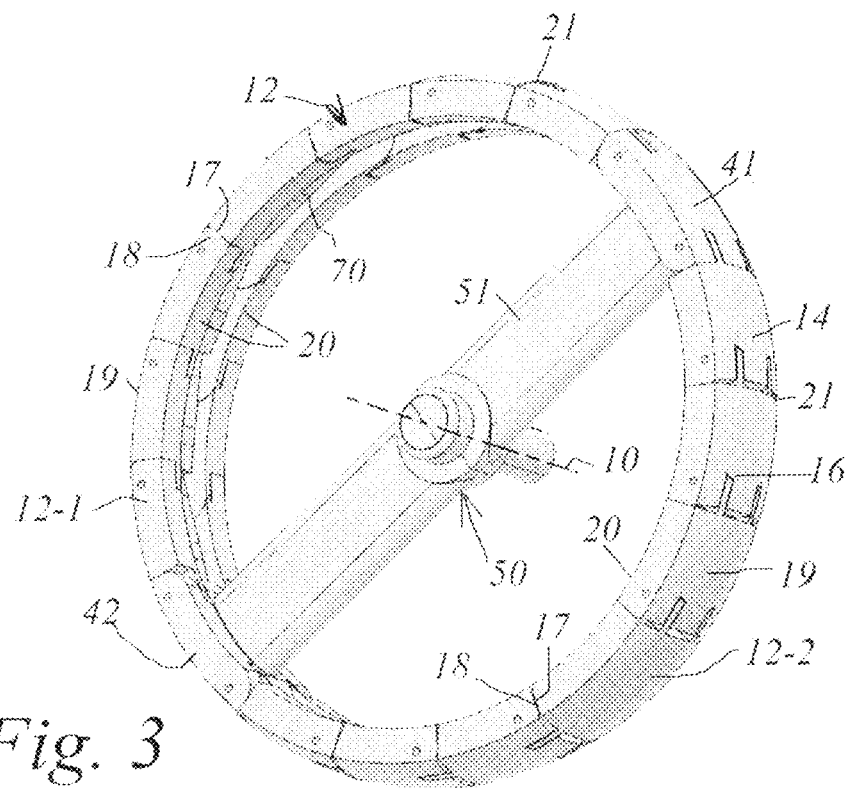
FIG. 3 is a perspective view of the foldable wheel embodiment of FIGS. 1 and 2 in its unfolded configuration.
Figure 4:
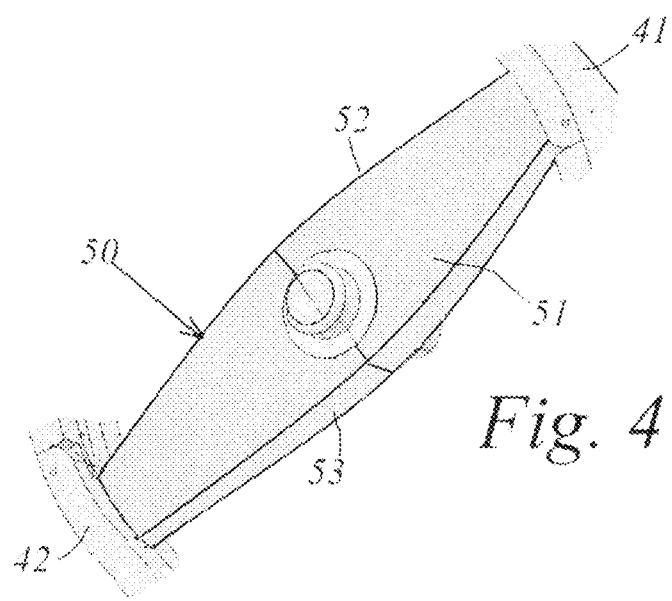
FIG. 4 is a perspective view of another embodiment of a portion of the wheel of FIGS. 1 to 3 in its unfolded configuration.

With reference more particularly to FIGS. 1 to 3, the present invention relates to a foldable wheel defined about an axis of rotation 10 of the wheel, the foldable wheel comprising a closed loop 12 made up of a plurality of links comprising at least two consecutive links 14, 16, each consecutive link being substantially in the shape of a sector of a ring of section as defined in a plane substantially perpendicular to the axis of rotation of the wheel that is substantially in the shape of a trapezoid, as defined above, thus having two non-parallel faces 17 and 18, a major base 19, and a minor base 20.

The wheel also has means for mounting two consecutive links 14 and 16 to pivot relative to each other about a link pivot axis, the two facing non-parallel faces 17 and 18 belonging respectively to the two consecutive links 14, 16 being defined in such a manner that when they are not in contact with each other (FIG. 2), they form a V-shape of apex 21 directed towards the two major bases 19, the V-shape presenting an angle at the apex 21 of non-zero value, and when they are in contact with each other (FIGS. 1 and 3), they form a V-shape with an angle at the apex having a zero value, the link pivot axis being situated substantially at the apex of the V-shape and being parallel to the axis of rotation 10 of the wheel.

In the invention, the means for mounting two consecutive links 14 and 16 to pivot relative to each other are constituted by a bearing 30 comprising two portions 31 and 32, respectively a male bearing portion 31 forming a pivot pin 33 on the pivot axis of the link, and a female bearing portion 32 forming a pivot housing that is substantially a cylindrical surface of revolution, the pivot pin 33 being pivotally mounted in the pivot housing 35, and means for mounting the male and female bearing portions 31 and 32 respectively at two points belonging to two consecutive links 14 and 16 and situated in the proximity of the apex of the V-shape, in such a manner that the axis of the housing is parallel to the axis of rotation 10 of the wheel.

In more industrial manner, and as mentioned above, the loop 12 comprises (FIGS. 1 and 3) a plurality of links, this plurality of links comprising an even number of links, and including two base links 41 and 42, in addition to the at least two above-defined consecutive links; the two loop portions 12-1; 12-2 between two base links on either side thereof being of lengths that are equal.

With the above-defined structure, the wheel can thus take on two configurations, a first configuration that is circular (FIGS. 1 and 3), in order to provide its well-known rolling function, and a second configuration that is flattened (FIG. 2) and that is more compact than the first configuration, the second configuration making it easier, to store the wheel, for example.

In order to make the wheel go from one of its two configurations to the other, and advantageously vice versa, the wheel includes controllable means 50 for exerting at least one of the following two forces between the two base links 41 and 42: a traction force and a thrust force, and naturally in entirely preferred manner, both of these forces in order to be able at will to unfold the wheel, and to fold it up again.

These means 50 for exerting at least one of the two forces are most advantageously constituted by a jack 51 having its two ends secured respectively to the two base links 41 and 42.

The jack may be of any type, e.g. manual, but it is preferably of a type that can easily be controlled automatically, such as an electric actuator or the like.

In a preferred embodiment (FIG. 2 and more particularly visible in a detail C1 in FIG. 2), the female bearing portion 32 forming a housing 35 is constituted by at least one tab 34 secured to one of the two consecutive links (16 in the figure) and offset from the non-parallel face 17, 18 of the link, facing the non-parallel face of the other link (14 in the figure), the housing 35 being constituted by a circularly cylindrical through hole made in the tab 34. The male bearing portion 31 is constituted by a slot or the like 36 cut out in the other one 14 of two consecutive links, this slot or the like opening out into the non-parallel face of the link facing the other link 16 that includes the tab 34, the tab being engaged in the slot or the like 36, the pivot pin 33 being mounted to co-operate with the slot or the like by being engaged in the through hole 35 made in the tab.

In an advantageous embodiment, making it possible to further reduce at least the transverse size of the loop when it is in its folded configuration, the minor base 20 of the trapezoid of each of the at least two consecutive links 14, 16 (and naturally of all of the links that are between the two base links 41 and 42) includes a groove 70 with respective ends that open out into each of the two non-parallel faces of the link, the grooves made in two consecutive links 14 and 16 forming a groove that is substantially continuous.

Furthermore, and most advantageously, in order to further limit the overall width of the loop when folded, the cross-section of the groove is arranged to surround a longitudinal side portion of the jack when the loop 12 is flattened along the jack, so that the two opposite faces 52 and 53 of the jack 51 that respectively face the two loop portions 12-1; 12-2 lying between the two base links 41, 42 penetrate into the two continuous grooves on both sides thereof, FIG. 2.

In preferred manner, when the jack acts to exert traction between the two base links 41 and 42 in order to pass the loop from its flat configuration (FIG. 2) to its circular configuration (FIGS. 1 & 3), in order to ensure that neither of the two loop portions 12-1 and/or 12-2 deforms in such a manner that two consecutive links form a V-shape of angle greater than that required for giving the loop its circular configuration, the two opposite faces 52 and 53 of the jack 51 present convex curvature, of convex shape defined by the person skilled in the art so as to give the best result without harming the width of the loop in its flattened configuration.

Furthermore, still for the same purpose, in particular to ensure that two consecutive links do not form between them an angle of less than 180° towards the outside of the wheel when it is in its circular configuration, the wheel includes (FIG. 2, detail C2) stop means 80 mounted to co-operate between the at least two consecutive links 14 and 16 so as to limit their pivoting relative to each other in such a manner that the non-zero value of the angle at the apex of the V-shape does not exceed a determined maximum value. These stop means 80 may be embodied in various ways, and the means shown, which are constituted by a lug penetrating into a complementary cavity) constitute one possible embodiment that is simple and advantageous.

In addition, in a manner that can be possible depending on the application of such a wheel, it may be advantageous for the wheel also to have a tire 60 (FIG. 1), surrounding the outside of the loop 12, this tire optionally being made of a shock-absorbing material surrounded by a cover, in particular a cover that is elastic and waterproof, etc. . . . . .

The advantages of the wheel of the invention, in particular compared with the wheel described and shown in the document referred to in the introduction of the present description, can clearly be seen from the present description.

The invention claimed is:

1. A foldable wheel defined about an axis of rotation of the wheel, the foldable wheel comprising a closed loop having at least two consecutive links, each consecutive link being substantially in the form of a ring sector of section as defined in a plane that is substantially perpendicular to said axis of rotation of the wheel that presents substantially the shape of a trapezoid, thus comprising two non-parallel faces, a major base, and a minor base, means for mounting two consecutive links to pivot relative to each other about a link pivot axis, the facing two non-parallel faces belonging respectively to two consecutive links being defined in such a manner that, when they are not in contact with each other, they form a V-shape of apex directed towards the two major bases, the V-shape having an angle at the apex of value that is not zero, and when they are in contact with each other, they form a V-shape with an angle at the apex of zero value, said link pivot axis being situated substantially at the apex of a said V-shape and being parallel to said axis of rotation of the wheel, wherein the means for mounting two said consecutive links to pivot relative to each other are constituted by:
- a bearing comprising two portions, respectively a male bearing portion forming a pivot pin on the link pivot axis and a female bearing portion forming a pivot housing, said pivot pin being pivotally mounted in said pivot housing; and
- means for mounting said male and female bearing portions respectively at two points belonging respectively to two consecutive links and situated in the proximity of the apex of said V-shape.

2. A wheel according to claim 1, wherein the loop has a plurality of links, said plurality of links comprising an even number of links, said plurality including two base links, the two loop portions between these two base links on either side thereof being of lengths that are equal.

3. A wheel according to claim 2, further including controllable means for exerting between the two base links at least one of the following two forces: a traction force and a thrust force.

4. A wheel according to claim 3, wherein the means for exerting at least one of the two forces are constituted by a jack having its two ends secured respectively to the two base links.

5. A wheel according to claim 4, wherein the two opposite faces of said jack that face respectively the two loop portions extending between the two base links present convex curvature.

6. A wheel according to claim 1, wherein:
- the female bearing portion forming a housing is constituted by at least one tab secured to one of the two consecutive links and offset from the non-parallel face of said link facing the non-parallel face of the other link, said housing being constituted by a through hole made in said tab; and
- the male bearing portion is constituted by a slot cut out in the other one of the two consecutive links, the slot opening out into the non-parallel face of the link facing the other link that includes the tab, said tab being engaged in said slot, the pivot pin being mounted to co-operate with said slot by being engaged in said through hole made in said tab.

7. A wheel according to claim 1, wherein the face of each of the two consecutive links corresponding to the minor base of the trapezoid includes a groove with respective ends that open out into each of the two non-parallel faces of the link, the grooves made in two consecutive links forming a continuous groove.

8. A wheel according to claim 7, wherein the cross-section of said groove is arranged to surround a longitudinal side portion of said jack when said loop is flattened along said jack.

9. A wheel according to claim 1, further including stop means mounted to co-operate between said two consecutive links to limit their pivoting relative to each other in such a manner that the non-zero value of the angle at the apex of the V-shape does not exceed a determined maximum value.

10. A wheel according to claim 1, including a tire surrounding the outside of said loop, said tire optionally being made of a shock-absorbing material.

* * * * *